US012052710B2

(12) United States Patent
Ohseki et al.

(10) Patent No.: US 12,052,710 B2
(45) Date of Patent: Jul. 30, 2024

(54) BASE STATION APPARATUS, TERMINAL APPARATUS, COMMUNICATION METHOD, AND COMPUTER-READABLE STORAGE MEDIUM

(71) Applicant: KDDI CORPORATION, Tokyo (JP)

(72) Inventors: Takeo Ohseki, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 15/923,157

(22) Filed: Mar. 16, 2018

(65) Prior Publication Data

US 2018/0206220 A1 Jul. 19, 2018

Related U.S. Application Data

(63) Continuation of application No. PCT/JP2016/080550, filed on Oct. 14, 2016.

(30) Foreign Application Priority Data

Oct. 29, 2015 (JP) .................................. 2015-213306

(51) Int. Cl.
*H04L 1/1829* (2023.01)
*H04L 1/1867* (2023.01)
(Continued)

(52) U.S. Cl.
CPC ........... *H04W 72/20* (2023.01); *H04L 1/1861* (2013.01); *H04L 1/1864* (2013.01);
(Continued)

(58) Field of Classification Search
CPC . H04W 72/0406; H04W 72/04; H04W 72/00; H04W 88/08; H04W 88/00;
(Continued)

(56) References Cited

U.S. PATENT DOCUMENTS

2012/0033588 A1* 2/2012 Chung .................. H04L 1/1812
370/280
2013/0114575 A1* 5/2013 Fu ......................... H04L 5/0053
370/336
(Continued)

FOREIGN PATENT DOCUMENTS

EP          2838301 A1    2/2015
JP      2015-164279 A     9/2015
(Continued)

OTHER PUBLICATIONS

3GPP TSG-RAN WG1 Meeting #76 Title: Remaining HARQ details for TDD eIMTA R1-140235 (Year: 2014).*
(Continued)

*Primary Examiner* — Jeffrey M Rutkowski
*Assistant Examiner* — Luna Weissberger
(74) *Attorney, Agent, or Firm* — Fitch, Even, Tabin & Flannery LLP

(57) ABSTRACT

There is provided a base station apparatus capable of transmitting a signal to a terminal apparatus and receiving an acknowledgement from the terminal apparatus. The base station apparatus transmits, to the terminal apparatus, information pertaining to a resource to be used to transmit the acknowledgement and determined in accordance with a length of a period from when the signal is transmitted to the terminal apparatus until the acknowledgement is received, and receives the acknowledgement transmitted by the terminal apparatus using the resource by specifying the resource based on the information.

14 Claims, 5 Drawing Sheets

(51) Int. Cl.
*H04L 5/00* (2006.01)
*H04W 72/20* (2023.01)
*H04W 88/08* (2009.01)

(52) U.S. Cl.
CPC .......... *H04L 1/1893* (2013.01); *H04L 1/1896* (2013.01); *H04L 5/0055* (2013.01); *H04W 88/08* (2013.01)

(58) Field of Classification Search
CPC ... H04L 1/1893; H04L 1/1867; H04L 1/1896; H04L 1/18; H04L 1/16; H04L 1/1861; H04L 1/1864; H04L 1/1829; H04L 1/12; H04L 5/0055; H04L 5/0053; H04L 5/003
USPC .......................................................... 370/329
See application file for complete search history.

(56) References Cited

U.S. PATENT DOCUMENTS

| | | | | |
|---|---|---|---|---|
| 2013/0195031 A1* | 8/2013 | Hessler | ................ | H04L 1/1819 370/329 |
| 2013/0258864 A1* | 10/2013 | Chen | ................ | H04L 1/1861 370/241 |
| 2014/0376421 A1* | 12/2014 | Yang | ................ | H04L 1/1819 370/280 |
| 2015/0181575 A1* | 6/2015 | Ng | ................ | H04L 5/0092 370/329 |
| 2015/0195070 A1* | 7/2015 | Kim | ................ | H04L 5/0048 370/329 |
| 2015/0215909 A1* | 7/2015 | Takeda | ................ | H04L 1/1854 370/329 |
| 2016/0050706 A1* | 2/2016 | Zhang | ................ | H04W 4/70 370/280 |
| 2016/0056926 A1* | 2/2016 | Li | ................ | H04L 1/0067 370/280 |
| 2016/0099799 A1* | 4/2016 | Bashar | ................ | H04W 72/02 370/280 |
| 2016/0100422 A1* | 4/2016 | Papasakellariou | .... | H04L 1/1861 370/329 |
| 2016/0112181 A1* | 4/2016 | Tabet | ................ | H04W 72/21 370/296 |
| 2016/0192151 A1* | 6/2016 | Marri Sridhar | ......... | H04W 4/20 455/418 |
| 2017/0265207 A1* | 9/2017 | Takeda | ................ | H04W 28/04 |

FOREIGN PATENT DOCUMENTS

| | | | | |
|---|---|---|---|---|
| WO | WO-2012136101 A1 * | 10/2012 | .......... | H04L 1/1893 |
| WO | WO-2016053844 A1 * | 4/2016 | .......... | H04L 1/1607 |

OTHER PUBLICATIONS

Remaining HARQ details for TDD elMTA, R-140235 (Year: 2014).*
EPO; European Application No. 16859602.1; Supplementary European Search Report dated Oct. 16, 2018.
Mediatek Inc, "Remaining HARQ details for TDD elMTA," 3GPP Draft; R1-140235 Remaining HARQ Details for TDD Eimta, 3rd Generation Partership Project, Feb. 10-14, 2014, Prague, CZ, XP050735788.
"3rd Generation Partnership Project; Technical Specification Group Radio Access Network; Evolved Universal Terrestrial Radio Access (E-UTRA); Physical layer procedures (Release 12)". 3GPP TS36. 213 V12.7.0 (Sep. 2015), pp. 1-241.
"Discussion on HARQ Details for TDD elMTA". Qualcomm Incorporated. 3GPP TSG-RAN WG1 #74bis R1-134601. Oct. 7-11, 2013. PUCCH resource allocation, Figure 2, p. 3.

* cited by examiner

BASE STATION APPARATUS, TERMINAL APPARATUS, COMMUNICATION METHOD, AND COMPUTER-READABLE STORAGE MEDIUM

This application is a Continuation of International Patent Application No. PCT/JP2016/080550, filed Oct. 14, 2016, which claims the benefit of Japanese Patent Application No. 2015-213306, filed Oct. 29, 2015, both of which are hereby incorporated by reference herein in their entirety.

TECHNICAL FIELD

The present invention relates to a base station apparatus, a terminal apparatus, a communication method, and a computer-readable storage medium and, more particularly, to a technique of designating a resource to be used in a wireless communication system.

BACKGROUND ART

In recent years, many wireless communication apparatuses have used HARQ (Hybrid Automatic Repeat Request). In HARQ, in response to a signal transmitted by a transmission-side apparatus, a reception-side apparatus transmits, to the transmission-side apparatus, an acknowledgement (ACK/NACK) indicating whether reception of the signal has succeeded. In accordance with the acknowledgement, the transmission-side apparatus retransmits the signal. The signal at the time of retransmission may be the same as or different from the signal transmitted before retransmission. For example, a signal including redundant components different from those at the time of the first transmission can be transmitted at the time of the second or subsequent retransmission.

When transmitting an acknowledgement, a communication resource for transmitting the acknowledgement is required. For example, in LTE (Long Term Evolution) of 3GPP (Third Generation Partnership Project), a terminal apparatus determines a resource for transmitting an acknowledgement (HARQ-ACK) in accordance with a signal transmitted in a downlink by a base station apparatus (see NPL 1). Note that the resource includes, for example, at least one of a frequency band (frequency channel), a time (time slot), and a code.

In LTE, the base station apparatus controls transmission in a PDSCH (Physical Downlink Shared Channel) by a PDCCH (Physical Downlink Control Channel). With respect to an acknowledgement associated with a signal transmitted by the PDSCH, the terminal apparatus determines a code and a position on a frequency axis to be used to transmit an HARQ-ACK based on the start index of a CCE (Control Channel Element) for itself among CCEs included in the PDCCH. In the current LTE standard, an HARQ-ACK is transmitted four subframes (4 ms) after a subframe in which a signal is transmitted/received. The length of a period from when the signal is transmitted/received until the HARQ-ACK is received will be referred to as an HARQ RTT (Round Trip Time) hereinafter. The terminal apparatus determines, in accordance with the index of a CCE assigned to itself, a code and the position of a resource block in a frequency direction in which the HARQ-ACK is to be transmitted, and transmits the HARQ-ACK using the code and the resource block of the determined position four subframes later. As described above, in the LTE standard, a time for four subframes is determined as the HARQ RTT, and a frequency and a code are determined by a CCE assigned to each terminal apparatus. Thus, HARQ-ACKs transmitted by a plurality of terminal apparatuses do not collide with each other. Note that HARQ-ACKs transmitted by the base station apparatus in response to reception of signals from the terminal apparatuses are transmitted to the plurality of terminal apparatuses by different resources.

CITATION LIST

Non Patent Literature

NPL 1: 3GPP TS36.213

SUMMARY OF INVENTION

Technical Problem

As a developed form of LTE-Advanced, it has been examined that the HARQ RTT is shortened. In this case, since the length of the RTT is different for each terminal apparatus, HARQ-ACKs transmitted in response to PDSCHs transmitted at different timings may be transmitted at the same timing. In this case, since the PDSCHs and their corresponding PDCCHs are transmitted at different timings, the start indices of CCEs, for different terminal apparatuses, included in the PDCCHs may coincide with each other. That is, although resources for transmission of HARQ-ACKs do not conflict in the conventional method, resources may conflict in the developed form.

The present invention provides a method for avoiding a conflict between resources used by a plurality of communication apparatuses.

Solution to Problem

According to one aspect of the present invention, a base station apparatus capable of transmitting a signal to a terminal apparatus and receiving an acknowledgement from the terminal apparatus includes a transmission unit configured to transmit, to the terminal apparatus, information pertaining to a resource to be used to transmit the acknowledgement and determined in accordance with a length of a period from when the signal is transmitted to the terminal apparatus until the acknowledgement is received, and a reception unit configured to receive the acknowledgement transmitted by the terminal apparatus using the resource by specifying the resource based on the information.

According to another aspect of the present invention, a terminal apparatus capable of receiving a signal from a base station apparatus and transmitting an acknowledgement to the base station apparatus includes a reception unit configured to receive, from the base station apparatus, information pertaining to a resource to be used to transmit the acknowledgement and determined in accordance with a length of a period from when the signal is received from the base station apparatus until the acknowledgement is transmitted, a specifying unit configured to specify the resource based on the information, and a transmission unit configured to transmit the acknowledgement using the specified resource.

Advantageous Effects of Invention

According to the present invention, it is possible to avoid a conflict between resources used by a plurality of communication apparatuses.

Other features and advantages of the present invention will be apparent from the following description taken in

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

An embodiment of the present invention will be described in detail below with reference to the accompanying drawings.

(Wireless Communication System)

Figure 1:
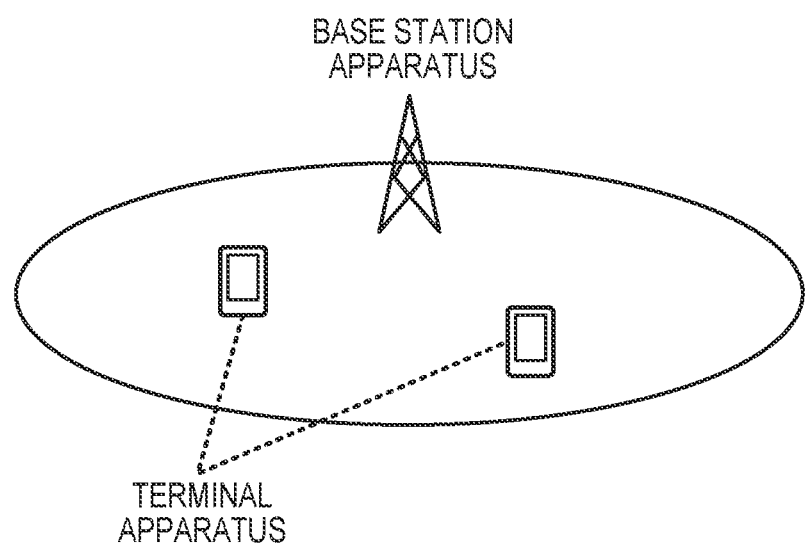
FIG. 1 is a view showing an example of the configuration of a wireless communication system.

FIG. 1 shows an example of the configuration of a wireless communication system according to the embodiment. The wireless communication system includes an LTE (Long Term Evolution) base station apparatus and a plurality of terminal apparatuses. Note that an arrangement and a procedure to be described below produce effects particularly when there are a plurality of terminal apparatuses, but they are not of a nature that is inapplicable when there is only one terminal apparatus. That is, even if only one terminal apparatus exists under the base station apparatus (the base station apparatus is connected as a serving base station), the following discussion is applicable. Similarly, a plurality of base station apparatuses can exist, as in a normal cellular communication system.

Assume that the base station apparatus transmits a data signal to the terminal apparatus mainly in a downlink, and the terminal apparatus transmits an acknowledgement (HARQ-ACK) in response to reception of the data signal. The technique according to this embodiment is usable in an arbitrary wireless communication system in which an acknowledgement is transmitted. The following discussion is also applicable to communication between terminals, and a case in which a data signal is transmitted in an uplink and an acknowledgement is transmitted in a downlink. Note that the acknowledgement can be formed by at least one of a positive acknowledgement and a negative acknowledgement. That is, only one or both of a positive acknowledgement and a negative acknowledgement may be used.

As described above, the length of a period from when a data transmission-side apparatus (base station apparatus) transmits a data signal to a reception-side apparatus (terminal apparatus) until the reception-side apparatus transmits, to the transmission-side apparatus, an acknowledgement to the data signal will be referred to as an RTT (Round Trip Time) hereinafter. In this embodiment, different RTTs can be used for the respective terminal apparatuses. That is, the first terminal apparatus can use the first RTT, and the second terminal apparatus can use the second RTT different from the first RTT. Furthermore, one terminal apparatus can use different RTTs in accordance with a situation, for example, a communication mode requested by an application in use or the state of the terminal apparatus. That is, a given terminal apparatus can use the first RTT at the first time, and use the second RTT at the second time. It is assumed that some terminal apparatuses do not support shortening of the RTT, and the RTTs of such terminal apparatuses are 4 ms (for four subframes). Note that shortening of the RTT is mainly assumed but there may exist a terminal apparatus that sets the RTT to a time longer than 4 ms.

Conventionally, the RTT is fixed to 4 ms. Therefore, each terminal apparatus can prevent a resource conflict by determining a resource in accordance with the start index of a CCE (Control Channel Element) in a PDCCH (Physical Downlink Control Channel), which is control information included in a signal transmitted by the base station apparatus. However, if some terminal apparatuses use the RTTs shorter or longer than 4 ms, even if each terminal apparatus determines a resource in accordance with a CCE, assigned to itself, included in the PDCCH, a resource conflict may occur. For example, the relationship between a conventional terminal apparatus (that is, the terminal apparatus uses an RTT of 4 ms) that receives a signal in the Xth subframe and a terminal apparatus that uses an RTT of 3 ms and receives a signal in the (X+1)th subframe will be examined. CCEs assigned to these terminal apparatuses have different subframe numbers, and may thus have the same start index. Therefore, the codes and the positions on the frequency axis of the resource blocks to be used by the terminal apparatuses for HARQ-ACKs overlap each other, and times also overlap each other due to the different RTTs. As a result, two HARQ-ACKs may collide with each other, and the base station apparatus may not be able to correctly receive the acknowledgements.

In this embodiment, to prevent such resource conflict, the positions of resources to be used for HARQ-ACKs are determined in accordance with the values of the RTTs used by the terminal apparatuses. For example, the base station apparatus according to this embodiment transmits, to the terminal apparatus, information pertaining to a resource (frequency position and code) to be used, which is determined in accordance with the length of the RTT. Then, the terminal apparatus specifies the resource to be used for the HARQ-ACK based on the received information pertaining to the resource to be used and the start index of a CCE assigned to the self apparatus.

In a given form, resources usable to transmit an HARQ-ACK are respectively associated with individual indices. The base station apparatus transmits, to the terminal apparatus, information for allowing the terminal apparatus to specify the index. Note that the resource includes at least one of the code and the frequency position of a PUCCH (Physical Uplink Control Channel). The code is a code for code multiplexing. Therefore, a plurality of indices may be associated with the same frequency position, and associated with the same code. However, different indices are respectively associated with different combinations of frequency positions and codes.

For example, the base station apparatus notifies the terminal apparatus of the value of an index corresponding to the RTT used by the terminal apparatus. The terminal apparatus specifies, as the index of a resource to be used to transmit an HARQ-ACK, a value obtained by adding the notified value of the index to the value of an index corresponding to a resource specified based on a CCE assigned to the self apparatus when the RTT is 4 ms. For example, assume that the terminal apparatus specifies an index h of a resource to be used to transmit an HARQ-ACK based on the index of the CCE assigned to the self apparatus when the RTT is 4 ms. At this time, if the RTT used by the terminal apparatus is 4 ms, the terminal apparatus transmits an HARQ-ACK using the resource corresponding to the index h. On the other hand, if the RTT used by the terminal apparatus is not 4 ms but x ms, the terminal apparatus receives a notification of an index Npucch(x) corresponding to an RTT of x ms, and transmits an HARQ-ACK using a resource corresponding to an index Npucch(x)+h.

Note that the base station apparatus can know, at the time of, for example, connection establishment, the RTT used by each terminal apparatus. Therefore, the base station apparatus can notify each terminal apparatus of the index Npucch(x) corresponding to the RTT used by the terminal apparatus. Note that the base station apparatus may notify each terminal apparatus of the indices Npucch(x) corresponding to all values which x can take. Note also that the base station apparatus need not notify, of Npucch(x) (Npucch(4)) described above, the terminal apparatus that uses an RTT of 4 ms as in the conventional technique. That is, such terminal apparatus need only operate as in the conventional technique, and it is unnecessary to notify the terminal apparatus of information of Npucch(x).

As a method of notifying the terminal apparatus of the above-described index Npucch(x), the base station apparatus may notify the terminal apparatus of a difference value Npucch_offset(x)=Npucch(x)−Npucch(4) with respect to the predetermined index Npucch(4) corresponding to a predetermined resource when the RTT is 4 ms. In this case, the terminal apparatus calculates Npucch_offset(x)+Npucch(4) by adding, to the notified difference value, the index Npucch(4) when the RTT is 4 ms, and adds h described above to the calculated value, thereby transmitting an HARQ-ACK using a resource corresponding to the addition result of Npucch_offset(x)+Npucch(4)+h. Note that the terminal apparatus knows the index Npucch(4) when the RTT is 4 ms, as in the conventional technique. Therefore, when the base station apparatus notifies the terminal apparatus of the above-described difference value Npucch_offset(x), the terminal apparatus can calculate Npucch(x)=Npucch_offset(x)+Npucch(4). In this notification method, if Npucch(x) −Npucch(4) and Npucch(x) (including Npucch(4)) are always positive, the difference value is always smaller than the value of Npucch(x), and thus a data amount associated with signaling becomes small.

With respect to the values of the plurality of RTTs, the base station apparatus may notify the terminal apparatus of, for example, a difference value Npucch_offset23=Npucch(2)−Npucch(3) between Npucch(2) corresponding to an RTT of 2 ms and Npucch(3) corresponding to an RTT of 3 ms and a difference value Npucch_offset34=Npucch(3)−Npucch(4) between Npucch(3) and Npucch(4) corresponding to an RTT of 4 ms. In this case, if the RTT used by the terminal apparatus is 2 ms, the terminal apparatus calculates Npucch_offset23+Npucch_offset34+Npucch(4), and adds h described above to the calculation result, thereby transmitting an HARQ-ACK using a resource corresponding to the addition result of Npucch_offset23+Npucch_offset34+Npucch(4)+h. Note that Npucch_offset23+Npucch_offset34+Npucch(4)=Npucch(2). In the above-described example, a case in which the RTT is 2 ms has been explained. However, the same notification is made for other RTT values. That is, the base station apparatus can notify the terminal apparatus of information including a plurality of difference values (for example, Npucch_offset23, Npucch_offset34, and the like) between the values of indices corresponding to the lengths of the plurality of RTTs and the values of indices corresponding to the lengths of other periods. The terminal apparatus specifies the value (for example, Npucch_offset23+Npucch_offset34+Npucch(4) =Npucch(2)) of an index corresponding to the length of a predetermined period (for example, RTT=2 ms) based on the Npucch(4) described above and at least one (for example, Npucch_offset23 and Npucch_offset34) of the plurality of difference values.

Note that possible value ranges of the indices may be set for the lengths of the plurality of RTTs to or not to overlap each other. That is, the possible value range of the index Npucch(2)+h when the RTT is 2 ms and the possible value range of the index Npucch(3)+h when the RTT is 3 ms may at least partially overlap each other. Similarly, the value range of Npucch(3)+h and that of Npucch(4)+h may at least partially overlap each other, and the value range of Npucch(2)+h and that of Npucch(4)+h may at least partially overlap each other.

Furthermore, the base station apparatus may notify the terminal apparatus of information of such value range as information of a set of indices. Then, the terminal apparatus specifies, from the set of indices, the index of a resource to be used to transmit an HARQ-ACK based on the value of the RTT used by itself and the index of a CCE assigned to itself.

As described above, the base station apparatus may notify the terminal apparatus of a representative value of the set of value ranges of indices or the set itself. The AND of one set and another set need not be an empty set. Note that the indices included in each set may be different for each of the plurality of terminal apparatuses. That is, information sent by the base station apparatus can be different for each terminal apparatus.

Note that, as described above, the base station apparatus can use a plurality of definition methods as a method of defining a resource for transmitting an HARQ-ACK. Each terminal apparatus can also support the plurality of definition methods. Therefore, at the time of sending information, the base station apparatus may notify the terminal apparatus of information indicating which of the definition methods is used for the information.

As described above, the terminal apparatus transmits an HARQ-ACK using a different resource in accordance with the RTT used by itself. This can distribute resources to be used to transmit HARQ-ACKs by the plurality of terminal apparatuses that transmit the HARQ-ACKs at the same timing, and thus a resource conflict hardly occurs.

The arrangement of each of the terminal apparatus and the base station apparatus for performing the above processing and the procedure of processing executed by these apparatuses will be described in detail below.

(Hardware Arrangement of Each of Base Station Apparatus and Terminal Apparatus)

Figure 2:
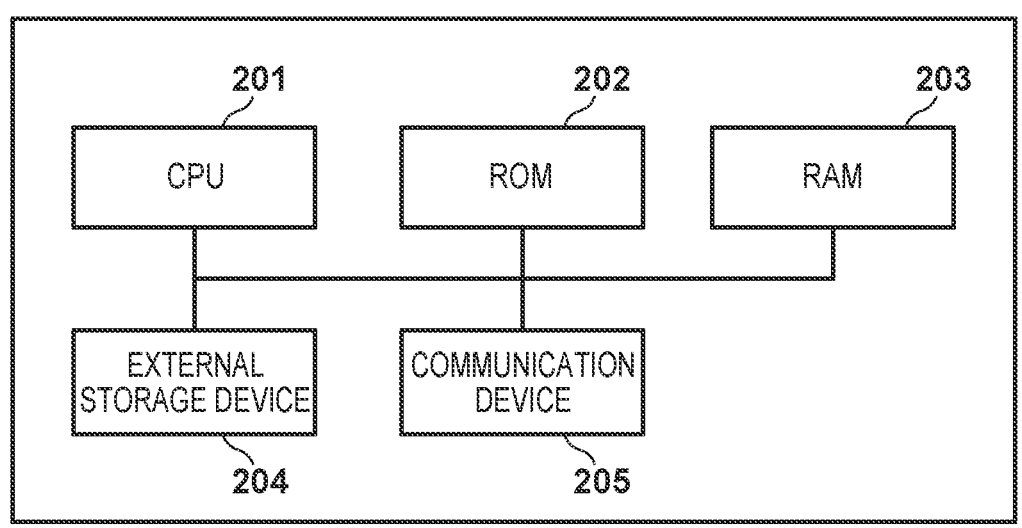
FIG. 2 is a block diagram showing an example of the hardware arrangement of each of a base station apparatus and a terminal apparatus.

FIG. 2 shows an example of the hardware arrangement of each of the base station apparatus and the terminal apparatus. In an example, each of the base station apparatus and the terminal apparatus has the hardware arrangement shown in FIG. 2, and includes, for example, a CPU 201, a ROM 202, a RAM 203, an external storage device 204, and a communication device 205. In each of the base station apparatus and the terminal apparatus, for example, the CPU 201 executes a program, recorded in one of the ROM 202, the RAM 203, and the external storage device 204, for implementing each function of each of the base station apparatus and the terminal apparatus, as described above.

Each of the base station apparatus and the terminal apparatus controls the communication device 205 by the CPU 201 to perform communication between the base station apparatus and the terminal apparatus. Note that FIG. 2 schematically shows that each of the base station apparatus and the terminal apparatus has the one communication device 205. The present invention, however, is not limited to this. For example, the base station apparatus may include a communication device for communication between base station apparatuses and a communication device for communication with the terminal apparatus. The terminal apparatus can include, for example, a communication device for communication with the base station apparatus and a communication device for communication between the terminals.

Note that each of the base station apparatus and the terminal apparatus may include dedicated hardware for executing each function, or may execute some functions by hardware and execute the remaining functions by a computer for operating the program. Alternatively, all the functions may be executed by the computer and program.

(Functional Arrangement of Base Station Apparatus)

Figure 3:
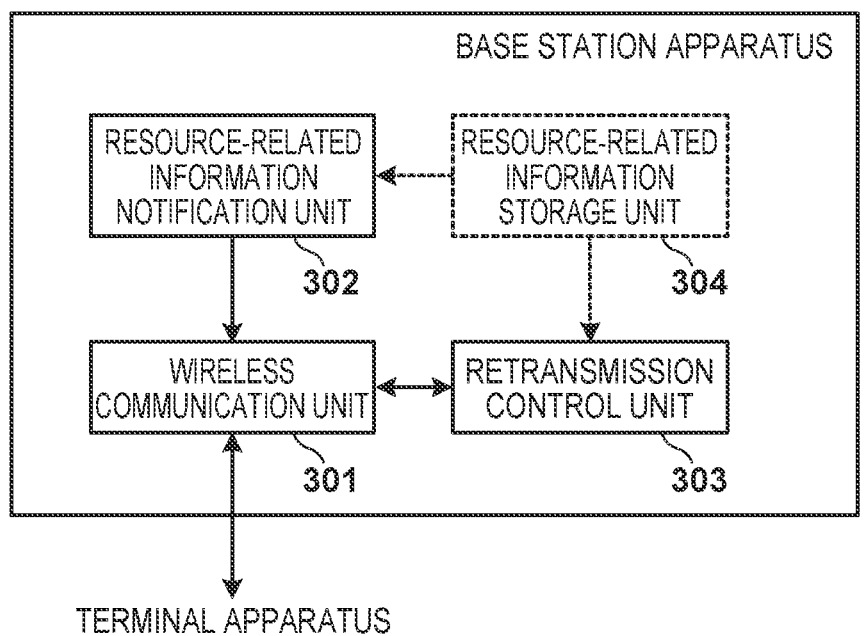
FIG. 3 is a block diagram showing an example of the functional arrangement of the base station apparatus.

FIG. 3 shows an example of the functional arrangement of the base station apparatus. As described above, the base station apparatus has a function of notifying the terminal apparatus of information for specifying a resource for transmitting an HARQ-ACK. The base station apparatus includes, for example, as functional components, a wireless communication unit 301, a resource-related information notification unit 302, and a retransmission control unit 303, and includes a resource-related information storage unit 304 in some cases. Note that this example shows only functional blocks related to notification control of resource-related information pertaining to an HARQ-ACK. However, the base station apparatus has a function as a base station apparatus for normal cellular communication, as a matter of course.

The wireless communication unit 301 transmits a wireless signal to the terminal apparatus, and receives a wireless signal from the terminal apparatus. The wireless signal transmitted from the base station apparatus to the terminal apparatus includes, for example, a data signal destined for the terminal apparatus and a control signal for transmitting the data signal. The control signal includes, for example, a PDCCH (Physical Downlink Control Channel), and the PDCCH includes CCEs (Control Channel Elements) respectively assigned to the plurality of terminal apparatuses as partner apparatuses to which data signals are transmitted. The wireless signal transmitted from the terminal apparatus to the base station apparatus includes an acknowledgement (HARQ-ACK) signal to the data signal transmitted by the base station apparatus.

Note that the wireless communication unit 301 can receive a data signal and a control signal from the terminal apparatus, and transmit an HARQ-ACK to the data signal. The wireless communication unit 301 can also transmit/receive other various signals.

The resource-related information notification unit 302 notifies, via the wireless communication unit 301, each terminal apparatus of information (to be referred to as "resource-related information" hereinafter) associated with a resource for transmitting an HARQ-ACK, that is different for each length of the HARQ RTT, as described above. Note that each terminal apparatus may be notified of the same resource-related information or different resource-related information. The resource-related information is information based on which the terminal apparatus can specify a resource to be used to transmit an HARQ-ACK, and the resource includes a frequency position and a code, as described above. Note that a time is specified by the RTT used by each terminal apparatus.

Note that the resource-related information notification unit 302 may explicitly notify the terminal apparatus of both the value of the RTT and resource-related information corresponding to it, or need not notify the terminal apparatus of, for example, the value of the RTT. For example, since the base station apparatus knows the RTT to be used by the terminal apparatus, it need not notify the terminal apparatus of the value of the RTT. Furthermore, when notifying one terminal apparatus of pieces of resource-related information pertaining to the plurality of RTTs, an information field corresponding to each of the plurality of RTTs is prepared in a notification message, and the resource-related information is stored in the field, thereby making it possible to omit notification of the value of the RTT. This is because when acquiring the resource-related information, the terminal apparatus can know the value of the corresponding RTT based on the field in which the resource-related information is stored. Furthermore, the resource-related information may be any information as long as the terminal apparatus can specify the resource designated by the base station apparatus based on the information. That is, the information may be, for example, the index of a predetermined resource or another value corresponding to the index. For example, the value of the index specified by the resource-related information need not be an arbitrary value within a possible value range, and some representative values within the value range may be used. In a simple example, if the value range of the index includes integer values of 0 to 90, 7 bits are required to designate an arbitrary one of these values. However, for example, if multiples of 3 among the values of 0 to 90 are taken as representative values, 31 representative values of 0, 3, . . . , 90 are obtained. Therefore, 5 bits suffice to designate one of these representative values. In this way, by limiting the representative values, it is possible to reduce an information amount for notification of an index.

The resource-related information notification unit 302 may send information stored in the resource-related information storage unit 304. In this case, the resource-related information storage unit 304 holds resource-related information in advance. That is, the resource-related information storage unit 304 stores resource-related information in association with each of the values of the plurality of RTTs. Note that the resource-related information notification unit 302 may specify resource-related information and notify the terminal apparatus of the specified information every time. In this case, the resource-related information storage unit 304 may be omitted.

The retransmission control unit 303 executes processing related to hybrid automatic retransmission control by HARQ. For example, the retransmission control unit 303 extracts a component of an HARQ-ACK from an uplink signal including the HARQ-ACK received via the wireless communication unit 301, and retransmits the data signal via the wireless communication unit 301, as appropriate. Note that the retransmission control unit 303 can specify in advance a resource to be used by each terminal apparatus to transmit an HARQ-ACK. That is, the retransmission control unit 303 knows the RTT used by each terminal apparatus and the start index of a CCE assigned to each terminal apparatus. Therefore, based on the knowledge, the retransmission control unit 303 can know a specific resource to be used for an HARQ-ACK by the same method as that of specifying a resource by each terminal apparatus. Note that the retransmission control unit 303 can acquire the resource-related information from resource-related information storage unit 304 or the resource-related information notification unit 302 to specify a resource to be used by the terminal apparatus to transmit an HARQ-ACK.

(Arrangement of Terminal Apparatus)

Figure 4:
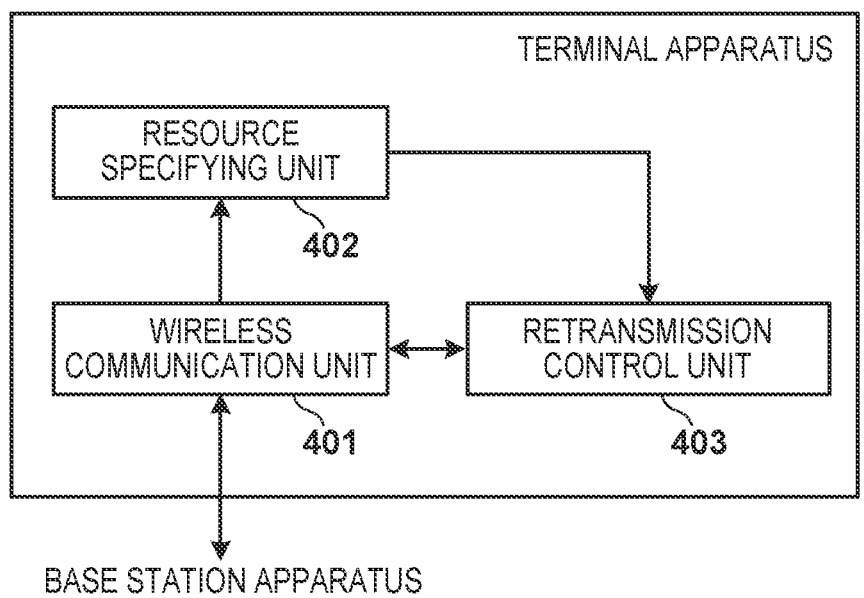
FIG. 4 is a block diagram showing an example of the functional arrangement of the terminal apparatus.

FIG. 4 shows an example of the functional arrangement of the terminal apparatus. The terminal apparatus includes, for example, as functional components, a wireless communication unit 401, a resource specifying unit 402, and a retransmission control unit 403. Note that this example shows only functional blocks related to retransmission control, especially, a resource specifying method at the time of transmission of an HARQ-ACK. However, the terminal apparatus has a function as a normal terminal apparatus, as a matter of course.

The wireless communication unit 401 transmits a wireless signal to the base station apparatus, and receives a wireless signal from the base station apparatus. The wireless communication unit 401 can receive, for example, a signal including the above-described resource-related information. The resource-related information may be included in a PDCCH (Physical Downlink Control Channel) or a PDSCH (Physical Downlink Shared Channel). Note that if a plurality of terminal apparatuses are notified of common resource-related information, the resource-related information may be included in a broadcast signal such as an SIB (System Information Block). The wireless communication unit 401 can transmit an uplink signal including an HARQ-ACK. In addition to the HARQ-ACK, the wireless communication unit 401 can transmit a data signal based on a transmission schedule (uplink grant) designated from the base station apparatus, and receive an HARQ-ACK to the data signal from the base station apparatus.

The resource specifying unit 402 acquires the resource-related information via the wireless communication unit 401. Based on the acquired resource-related information and the position (start index) of a CCE in the PDCCH when the base station apparatus performs data transmission, the resource specifying unit 402 specifies a resource to be used to transmit an HARQ-ACK. Information of the specified resource is transferred to the retransmission control unit 403.

The retransmission control unit 403 determines whether reception of the data signal from the base station apparatus via the wireless communication unit 401 has succeeded, and transmits an acknowledgement (HARQ-ACK) to the base station apparatus via the wireless communication unit 401. When transmitting the acknowledgement, the retransmission control unit 403 uses the resource (frequency position and code) specified by the resource specifying unit 402. The resource with which the acknowledgement is transmitted can be a resource in the PUCCH (Physical Uplink Control Channel) but may be a resource in a channel other than the PUCCH. A conventionally defined resource usable for the PUCCH may be extended, and the PUCCH including an acknowledgement may be transmitted within a wider resource range.

(Procedure of Processing)

The procedure of processing executed in the wireless communication system according to this embodiment will be described with reference to FIG. 5. The base station apparatus transmits resource-related information (S501). Examples of the resource-related information transmitted at this time will be described below with reference to FIGS. 6 to 9. Note that the wireless communication system can selectively use a plurality of methods such as methods of FIGS. 6 to 9 to be described below, and the base station apparatus can perform transmission by including, in the resource-related information in S501, information indicating a method in use. Note that the following description assumes that there exist terminal apparatuses that respectively use HARQ RTTs of 2 ms, 3 ms, and 4 ms and transmission timings of HARQ-ACKs coincide with each other. However, for example, there may exist a terminal apparatus that uses an RTT of 1 ms, or a terminal apparatus that uses an RTT of 5 ms or longer. In either case, the following processing can be equally applied.

Figure 6:
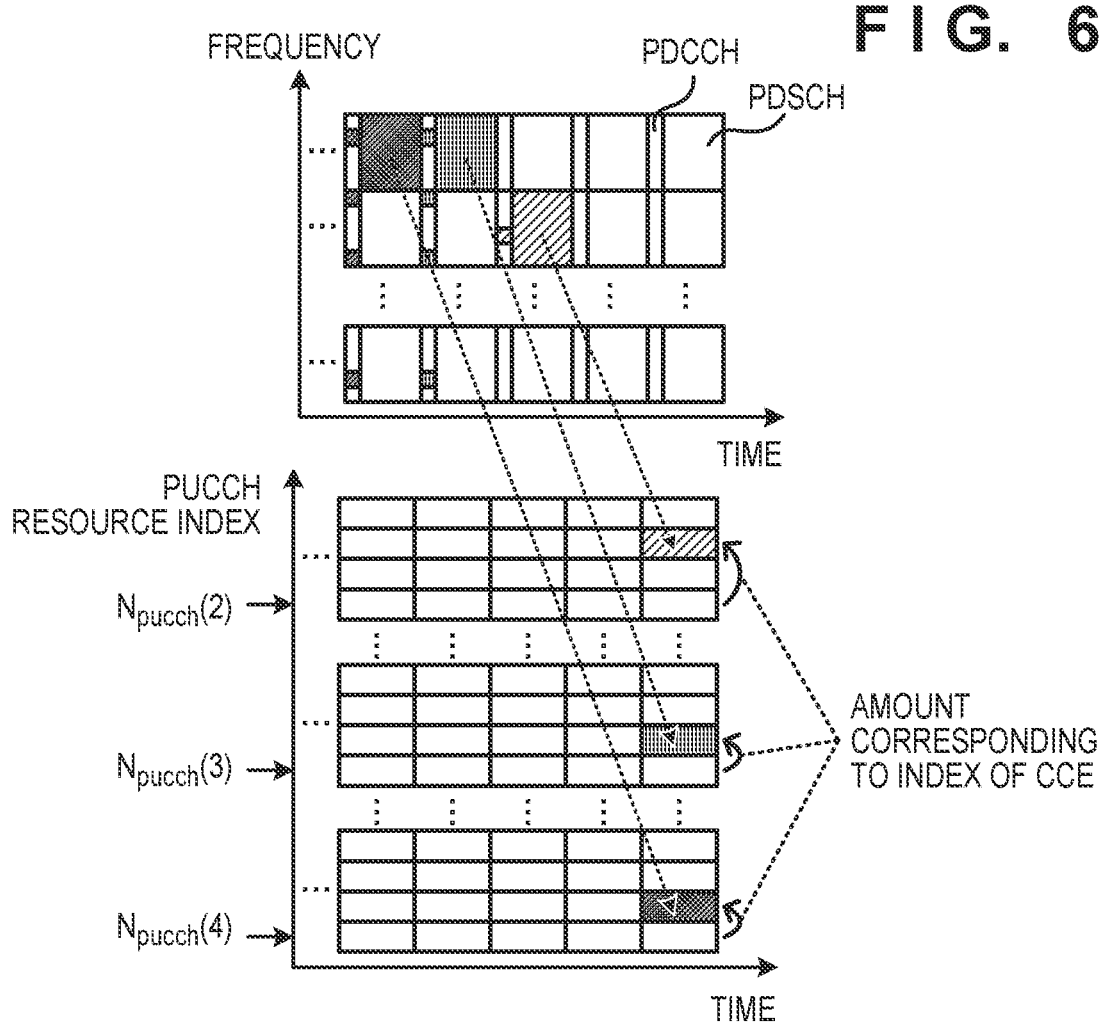
FIG. 6 is a schematic view showing the first example of notified resource-related information.

In the example shown in FIG. 6, the terminal apparatus is notified of the index Npucch(x) of the resource of a PUCCH as a reference for each HARQ RTT(x) where x represents the value of the RTT, and a unit is subframe or ms. Furthermore, Npucch(4) is shown in FIG. 6 but this is an index corresponding to the conventional RTT, and may not be sent. In this example, the terminal apparatus that uses an RTT of 2 ms specifies the index of a resource to be used by offsetting the index by a value determined in accordance with the start index of a CCE in the PDCCH with reference to Npucch(2). Similarly, the terminal apparatus that uses an RTT of 3 ms specifies the index of a resource to be used by offsetting the index by a value determined in accordance with the start index of a CCE in the PDCCH with reference to Npucch(3). In this way, even if the start indices of the CCEs are the same, the index used as a reference index when specifying the index of a resource for transmission of an HARQ-ACK is different for each RTT. Therefore, it is possible to prevent a conflict between resources associated with HARQ-ACK transmission operations.

Figure 7:
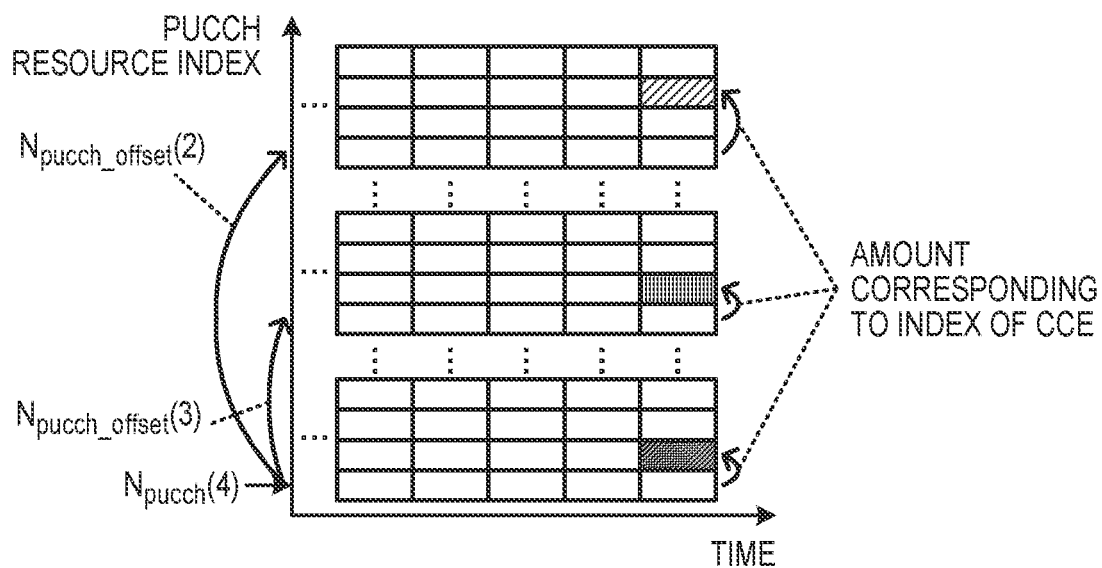
FIG. 7 is a schematic view showing the second example of the notified resource-related information.
Figure 8:
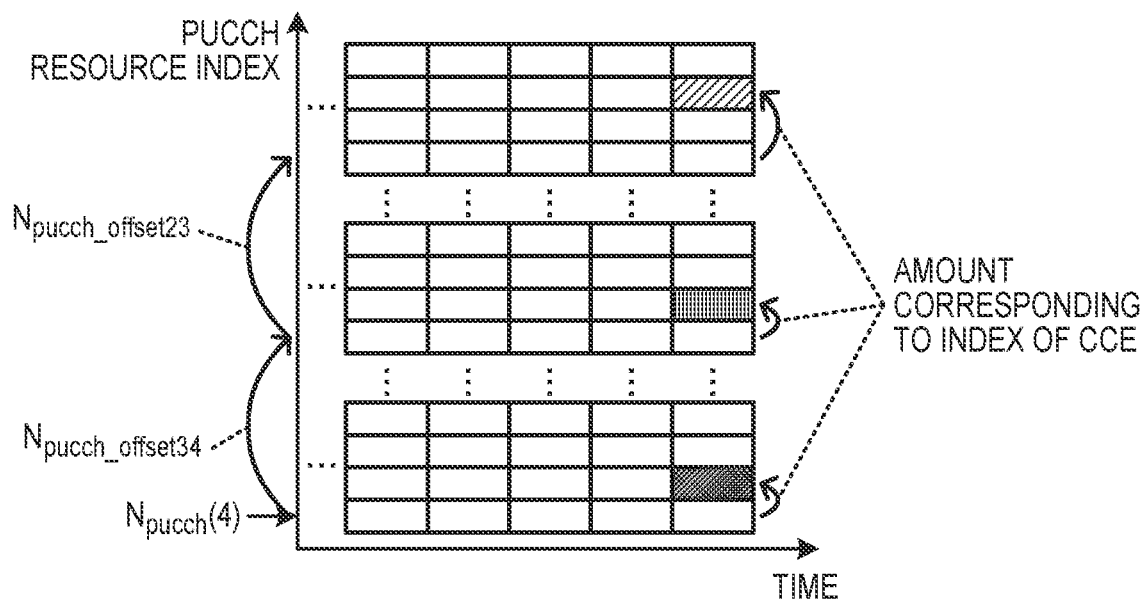
FIG. 8 is a schematic view showing the third example of the notified resource-related information.

The examples shown in FIGS. 7 and 8 are the same as in FIG. 6 in terms of the basic principle but a reference index when specifying the index of a resource for transmission of an HARQ-ACK is changed.

In the example shown in FIG. 7, reference indices Npucch(2) and Npucch(3) for RTTs of 2 ms and 3 ms are represented by difference values with respect to the index Npucch(4) corresponding to the conventional RTT. That is, the base station apparatus notifies the terminal apparatus, that uses an RTT of 2 ms, of a value of Npucch_offset(2)=Npucch(2)−Npucch(4) as a difference value between Npucch(2) and Npucch(4). The terminal apparatus can specify the reference index Npucch(2) when the RTT is 2 ms by adding the index Npucch(4) corresponding to the conventional RTT to the difference value Npucch_offset(2). Similarly, the base station apparatus notifies the terminal apparatus, that uses an RTT of 3 ms, of a value of Npucch_offset(3)=Npucch(3)−Npucch(4) as a difference value between Npucch(3) and Npucch(4). Note that the base station apparatus may broadcast, to the respective terminal apparatuses, the above-described difference values associated with all the RTT values.

In the example shown in FIG. 8, for example, a reference index for each RTT is represented by a difference value with respect to a reference index for another RTT. For example, the base station apparatus notifies the terminal apparatus of the difference value Npucch_offset23 between the reference index Npucch(2) for an RTT of 2 ms and the reference index Npucch(3) for an RTT of 3 ms, and the difference value Npucch_offset34 between the reference index Npucch(3) for an RTT of 3 ms and the reference index Npucch(4) for an RTT of 4 ms. Note that Npucch_offset23=Npucch(2)–Npucch(3), and Npucch_offset34=Npucch(3)–Npucch(4). The terminal apparatus that uses an RTT of 2 ms can specify Npucch(2) by calculating Npucch_offset23+Npucch_offset34+Npucch(4). Note that Npucch(3) can be calculated, in the same manner as in the example of FIG. 7.

Note that the examples shown in FIGS. 6 to 8 have been explained in which resource indices for the respective RTTs are arranged not to overlap each other. However, at least some of the resource indices may overlap each other.

In the example shown in FIG. 9, a case in which a possible set of resource indices is defined for each RTT value and sent will be described. In the example shown in FIG. 9, sets of resource indices are defined for RTTs of 2 ms and 3 ms so that the sets overlap each other but may be defined so that the sets do not overlap each other. In the example shown in FIG. 9, an index range surrounded by a thick solid line is defined as a set of indices for an RTT of 3 ms, and an index range surrounded by a thick broken line is defined as a set of indices for an RTT of 2 ms.

Figure 9:
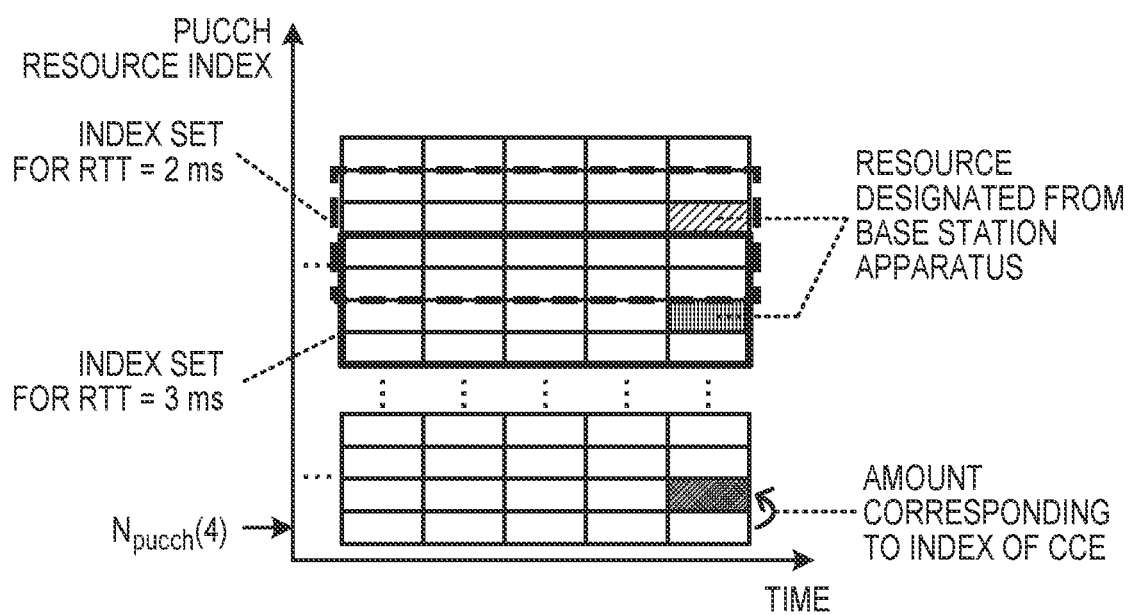
FIG. 9 is a schematic view showing the fourth example of the notified resource-related information.

Note that in the example shown in FIG. 9, a possible set of resource indices for each RTT may be different for each notification target terminal apparatus, or may be the same. If a different set is set for each notification target terminal apparatus, information of the set may be sent by, for example, RRC (Radio Resource Control) signaling or another method. By setting different sets for the respective notification target terminal apparatuses, the indices of resources used by the plurality of terminal apparatuses can be distributed. Alternatively, if a common set is set for the notification target terminal apparatuses, information of the set may be sent by, for example, RRC signaling or a broadcast signal such as an SIB (System Information Block).

In the example shown in FIG. 9, since the base station apparatus knows the value of the RTT used by each terminal apparatus, it selects a resource to be used by the terminal apparatus from the set of indices corresponding to the RTT, and notifies the terminal apparatus of the selection result through the PDCCH. That is, in the example shown in FIG. 9, the terminal apparatus that uses an RTT of 2 ms receives, from the base station apparatus, designation indicating the use of the third resource from the bottom of the set of indices corresponding to an RTT of 2 ms, and specifies, in accordance with the designation, the resource to be used. Similarly, in the example shown in FIG. 9, the terminal apparatus that uses an RTT of 3 ms receives, from the base station apparatus, designation indicating the use of the second resource from the bottom of the set of indices corresponding to an RTT of 3 ms, and specifies, in accordance with the designation, the resource to be used. Note that the base station apparatus need not make this notification to the terminal apparatus that uses an RTT of 4 ms. The terminal apparatus that uses an RTT of 4 ms can specify, in accordance with the start index of a CCE used in the PDCCH, the index of a resource to be used to transmit an HARQ-ACK, as in the conventional technique.

When the sets shown in FIG. 9 are used, if each set includes four indices, the base station apparatus can designate an index to be used by 2 bits. That is, as compared with a case in which a resource to be used is designated by targeting all resource indices, signaling overhead for notification of a resource to be used can be reduced by defining the above-described sets. Furthermore, when the base station apparatus designates resource indices to be used by the respective terminal apparatuses, a resource conflict is prevented from occurring in at least the same cell. Note that the terminal apparatus can specify, within the range of the notified set, the index of a resource to be used to transmit an HARQ-ACK, in accordance with the start index of a CCE used in the PDCCH.

Referring back to FIG. 5, the base station apparatus transmits a data signal (PDSCH) to the terminal apparatus (S502). At this time, along with the data signal, a control signal (PDCCH) is transmitted. Based on the resource-related information received in S501 and the start index of the CCE included in the PDCCH, the terminal apparatus specifies a resource to be used to transmit an HARQ-ACK, as described with reference to FIGS. 6 to 9 (S503). Then, the terminal apparatus transmits the HARQ-ACK to the base station apparatus using the specified resource (S504).

Even if the data signal reception-side apparatuses (the terminal apparatuses in the above example) transmit HARQ-ACKs with various RTTs, resources used for the HARQ-ACKs never conflict. As a result, the data signal transmission-side apparatus (the base station apparatus in the above example) can correctly receive acknowledgements, thereby preventing deterioration in efficiency of retransmission control.

Figure 5:
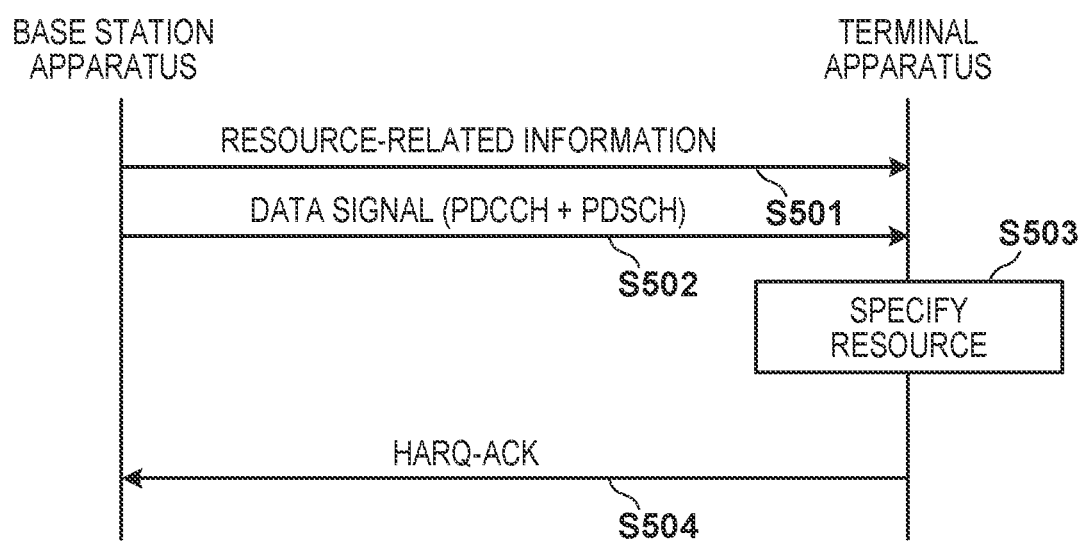
FIG. 5 is a sequence chart showing the procedure of processing executed in the wireless communication system.

Note that the example of FIG. 5 has explained a case in which the resource-related information and the data signal are separately transmitted. However, the resource-related information and the data signal may be transmitted at the same time. For example, the resource-related information may be stored in the PDCCH transmitted together with the PDSCH in S502, and transmitted, or may be stored in the PDSCH and transmitted. Alternatively, the base station apparatus may notify the terminal apparatus of the resource-related information by RRC (Radio Resource Control) signaling at the time of, for example, connection establishment. If common resource-related information is used for the plurality of terminal apparatuses, the resource-related information may be broadcast.

The representative arrangement and processing procedure according to this embodiment have been described above but are merely examples. Various modifications and changes to the embodiment described in this specification within the scope of claims are also included in the scope of claims of the present invention, as a matter of course.

The present invention is not limited to the above-described embodiment, and various changes and modifications can be made within the spirit and scope of the present invention. Therefore, to apprise the public of the scope of the present invention, the following claims are made.

The invention claimed is:

1. A base station apparatus capable of transmitting a signal to a terminal apparatus and receiving an acknowledgement from the terminal apparatus, comprising a processor coupled to a memory, wherein the processor is configured to:
   receive, from the terminal apparatus, lengths of a plurality of periods designated by the terminal apparatus, wherein the lengths of a plurality of periods is received in information regarding capability of the terminal apparatus, wherein each of the lengths of a plurality of periods is a length of a period from when the signal is transmitted to the terminal apparatus until the acknowledgement is received,
   transmit, to the terminal apparatus, information pertaining to a resource to be used to transmit the acknowledgement and determined in accordance with the lengths of the plurality of periods, wherein the information designates a timing to transmit the acknowledgement;

transmit the signal to the apparatus after transmitting the information to the terminal apparatus; and receive the acknowledgement transmitted by the terminal apparatus using the resource by specifying the resource based on the information, at the timing designated by the base station apparatus wherein a plurality of resources usable to transmit the acknowledgement are respectively associated with different indices, the information includes a value of an index corresponding to the lengths of the plurality of periods, the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

2. The base station apparatus according to claim 1, wherein the information includes a difference value between a value of an index corresponding to the lengths of the plurality of periods and a value of an index associated with a predetermined resource, the value of the index corresponding to the lengths of the plurality of periods is specified based on the difference value included in the information and the value of the index associated with the predetermined resource by the terminal apparatus, and a resource to be used to transmit the acknowledgement is further specified based on a resource having, as an index, a value obtained from the specified value and a CCE index.

3. The base station apparatus according to claim 1, wherein the information includes a plurality of difference values between values of indices corresponding to lengths of a plurality of periods and values of indices corresponding to lengths of other periods, the value of the index corresponding to the length of the period is specified based on a value of an index associated with a predetermined resource and at least one of the plurality of difference values included in the information, and a resource to be used to transmit the acknowledgement is specified based on, a resource having, as an index, a value obtained from the specified value and a CCE index.

4. The base station apparatus according to claim 3, wherein the information includes at least a first difference value between a value of an index corresponding to a length of a first period and a value of an index corresponding to a length of a second period, and a second difference value between the value of the index corresponding to the length of the second period and a value of an index corresponding to a length of a third period.

5. The base station apparatus according to claim 1, wherein the information includes a plurality of pieces of information of sets of indices, that respectively correspond to lengths of a plurality of periods, one of the plurality of sets is specified in accordance with a period from when the terminal apparatus receives the signal from the base station apparatus until the terminal apparatus transmits the acknowledgement to the base station apparatus, and a resource to be used to transmit the acknowledgement from the one set is further specified.

6. The base station apparatus according to claim 5, wherein the plurality of sets transmitted to a first terminal apparatus are different from the plurality of sets transmitted to a second terminal apparatus.

7. The base station apparatus according to claim 1, wherein the information further includes information for specifying a method of defining a resource to be used to transmit the acknowledgement, that is used in the information.

8. The base station apparatus according to claim 1, wherein the resource includes at least one of a frequency and a code.

9. A terminal apparatus capable of receiving a signal from a base station apparatus and transmitting an acknowledgement to the base station apparatus, comprising a processor coupled to a memory, wherein the processor is configured to:

transmit to the base station apparatus, lengths of a plurality of periods designated by the terminal apparatus, wherein the lengths of a plurality of periods designated by the terminal apparatus is transmitted in information regarding capability of the terminal apparatus, wherein each of the lengths of a plurality of periods is a length of a period from when the signal is transmitted to the terminal apparatus until the acknowledgement is received, receive, from the base station apparatus, information pertaining to a resource to be used to transmit the acknowledgement and determined in accordance with the lengths of the plurality of periods, wherein the information designates a timing to transmit the acknowledgement;

specify the resource based on the information;

receive the signal from the base station apparatus; and transmit the acknowledgement using the specified resource, at the timing designated by the base station apparatus, wherein a plurality of resources usable to transmit the acknowledgement are respectively associated with different indices, the information regarding the capability of the terminal apparatus includes a value of an index corresponding to the lengths of the plurality of periods, and the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

10. The terminal apparatus according to claim 9, wherein the processor is configured to specify the resource based on the information and a resource used to transmit control information included in the signal when the signal is received from the base station apparatus.

11. A communication method executed by a base station apparatus capable of transmitting a signal to a terminal apparatus and receiving an acknowledgement from the terminal apparatus, the method comprising:

receiving, from the terminal apparatus, lengths of a plurality of periods designated by the terminal apparatus, wherein the lengths of a plurality of periods is received in information regarding capability of the terminal apparatus, wherein each of the lengths of a plurality of periods is a length of a period from when the signal is transmitted to the terminal apparatus until the acknowledgement is received, transmitting, to the terminal apparatus, information pertaining to a resource to be used to transmit the acknowledgement and determined in accordance with the lengths of the plurality of periods, wherein the information designates a timing to transmit the acknowledgement;

transmitting the signal to the apparatus after transmitting the information to the terminal apparatus; and receiving the acknowledgement transmitted by the terminal apparatus using the resource by specifying the resource based on the information, at the timing designated by the base station apparatus, wherein a plurality of resources usable to transmit the acknowledgement are respectively associated with different indices, the information regarding the capability of the terminal apparatus includes a value of an index corresponding to the lengths of the plurality of periods, and the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

12. A communication method executed by a terminal apparatus capable of receiving a signal from a base station apparatus and transmitting an acknowledgement to the base station apparatus, the method comprising:

transmitting to the base station apparatus, lengths of a plurality of periods designated by the terminal apparatus, wherein the lengths of a plurality of periods designated by the terminal apparatus is transmitted in information regarding capability of the terminal apparatus, wherein each of the lengths of a plurality of periods is a length of a period from when the signal is transmitted to the terminal apparatus until the acknowledgement is received, receiving, from the base station apparatus, information pertaining to a resource to be used to transmit the acknowledgement and determined in accordance with the lengths of the plurality of periods, wherein the information designates a timing to transmit the acknowledgement;

specifying the resource based on the information;

receiving the signal from the base station apparatus; and transmitting the acknowledgement using the specified resource, at the timing designated by the base station apparatus, wherein a plurality of resources usable to transmit the acknowledgement are respectively associated with different indices, the information regarding the capability of the terminal apparatus includes a value of an index corresponding to the lengths of the plurality of periods, and the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

13. A non-transitory computer-readable storage medium for storing a program for causing a computer, included in a base station apparatus capable of transmitting a signal to a terminal apparatus and receiving an acknowledgement from the terminal apparatus, to:

receive, from the terminal apparatus, lengths of a plurality of periods designated by the terminal apparatus, wherein the lengths of a plurality of periods is received in information regarding capability of the terminal apparatus, wherein each of the lengths of a plurality of periods is a length of a period from when the signal is transmitted to the terminal apparatus until the acknowledgement is received, from the terminal apparatus, transmit, to the terminal apparatus, information pertaining to a resource to be used to transmit the acknowledgement and determined in accordance with the lengths of the plurality of periods, wherein the information designates a timing to transmit the acknowledgement;

transmit the signal to the apparatus after transmitting the information to the terminal apparatus; and receive the acknowledgement transmitted by the terminal apparatus using the resource by specifying the resource based on the information, at the timing designated by the base station apparatus, wherein a plurality of resources usable to transmit the acknowledgement are respectively associated with different indices, the information regarding the capability of the terminal apparatus includes a value of an index corresponding to the lengths of the plurality of periods, the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

14. A non-transitory computer-readable storage medium for storing a program for causing a computer, included in a terminal apparatus capable of receiving a signal from a base station apparatus and transmitting an acknowledgement to the base station apparatus, to:

transmit to the base station apparatus, lengths of a plurality of periods designated by the terminal apparatus, wherein the lengths of a plurality of periods designated by the terminal apparatus is transmitted in information regarding capability of the terminal apparatus, wherein each of the lengths of a plurality of periods is a length of a period from when the signal is transmitted to the terminal apparatus until the acknowledgement is received, receive, from the base station apparatus, information pertaining to a resource to be used to transmit the acknowledgement and determined in accordance with the lengths of the plurality of periods, wherein the information designates a timing to transmit the acknowledgement;

specify the resource based on the information;

receive the signal from the base station apparatus; and transmit the acknowledgement using the specified resource, at the timing designated by the base station apparatus, wherein a plurality of resources usable to transmit the acknowledgement are respectively associated with different indices, the information regarding the capability of the terminal apparatus includes a value of an index corresponding to the lengths of the plurality of periods, and the resource is specified based on the resource having, as an index, a value obtained from the value included in the information and a CCE (Control Channel Element) index, and the base station apparatus determines the timing to transmit the acknowledgement according to the lengths of the plurality of periods designated by the terminal apparatus.

* * * * *